United States Patent
Abraham et al.

(10) Patent No.: US 9,984,550 B2
(45) Date of Patent: May 29, 2018

(54) SMART GARMENT THAT COMMUNICATES AT LEAST ONE PARAMETER TO A RECEIVER

(71) Applicant: International Business Machines Corporation, Armonk, NY (US)

(72) Inventors: Subil M. Abraham, Lewisville, TX (US); Marco A. Benavides, Dallas, TX (US); Stephanie De La Fuente, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 15/162,990

(22) Filed: May 24, 2016

(65) Prior Publication Data

US 2017/0345279 A1    Nov. 30, 2017

(51) Int. Cl.
| | |
|---|---|
| *G08B 21/00* | (2006.01) |
| *G08B 21/18* | (2006.01) |
| *G06Q 30/02* | (2012.01) |
| *H04L 29/08* | (2006.01) |

(52) U.S. Cl.
CPC ....... *G08B 21/182* (2013.01); *G06Q 30/0201* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 7,133,740 B1 | 11/2006 | Stenson et al. | |
| 7,321,984 B2 | 1/2008 | Fu | |
| 8,682,738 B2 | 3/2014 | Ivanov | |
| 2007/0198121 A1 | 8/2007 | Zheng | |
| 2013/0204707 A1 | 8/2013 | Ptucha et al. | |
| 2014/0032331 A1 | 1/2014 | Blanch et al. | |
| 2014/0279186 A1 | 9/2014 | Juan et al. | |
| 2015/0040282 A1* | 2/2015 | Longinotti-Buitoni | A61B 5/6804 2/69 |

(Continued)

FOREIGN PATENT DOCUMENTS

| | | |
|---|---|---|
| CN | 100409244 C | 8/2008 |
| CN | 102043882 A | 5/2011 |

(Continued)

OTHER PUBLICATIONS

Al-Omar, N.N., et al., "The Design and Development of a Web-Based Virtual Closet: The Smart Closet Project," Journal of Advanced Management Science, Mar. 2013, vol. 1, No. 1, pp. 124-128.

(Continued)

*Primary Examiner* — Julie Lieu
(74) *Attorney, Agent, or Firm* — Cuenot, Forsythe & Kim, LLC

(57) ABSTRACT

Sensor data generated by a plurality of sensors integrated into the smart garment can be received by a processor integrated into a smart garment. Based on the sensor data, the processor can generate at least one parameter indicating a manner in which the smart garment is worn. A transmitter integrated into the smart garment can communicate to a receiver the at least one parameter indicating the manner in which the smart garment is worn.

20 Claims, 4 Drawing Sheets

(56) References Cited

U.S. PATENT DOCUMENTS

| | | | |
|---|---|---|---|
| 2015/0057984 A1 | 2/2015 | Nicoletti et al. | |
| 2015/0127592 A1 | 5/2015 | Yan et al. | |
| 2015/0134496 A1* | 5/2015 | Grinblat | G06T 19/00 |
| | | | 705/27.2 |
| 2016/0000374 A1* | 1/2016 | Dandekar | A61B 5/0002 |
| | | | 600/301 |
| 2016/0128594 A1* | 5/2016 | Amir | A41D 1/20 |
| | | | 600/382 |
| 2016/0256104 A1* | 9/2016 | Romem | A61N 1/0484 |
| 2016/0331974 A1* | 11/2016 | Lyons | A61N 1/36139 |
| 2016/0358504 A1* | 12/2016 | Powch | A61B 5/02055 |
| 2017/0060298 A1* | 3/2017 | Hwang | A61B 5/6807 |
| 2017/0094216 A1* | 3/2017 | Ekambaram | H04N 5/23293 |
| 2017/0150926 A1* | 6/2017 | Amir | A61B 5/6804 |

FOREIGN PATENT DOCUMENTS

| | | |
|---|---|---|
| CN | 103820971 A | 5/2014 |
| CN | 203894805 U | 10/2014 |
| CN | 104407775 A | 3/2015 |
| KR | 1020120125060 A | 11/2012 |
| WO | 2014138204 A1 | 9/2014 |

OTHER PUBLICATIONS

"E-textiles," [online] Wikipedia, the Free Encyclopedia, Mar. 11, 2016, retrieved from the Internet: <https://en.wikipedia.org/wiki/E-textiles>, 3 pg.

* cited by examiner

500

Receive, by a processor integrated into a smart garment, sensor data generated by a plurality of sensors integrated into the smart garment
505

Generate, by the processor, based on the sensor data, at least one parameter indicating a manner in which the smart garment is worn
510

Communicate to a receiver, by a transmitter integrated into the smart garment, the at least one parameter indicating the manner in which the smart garment is worn
515

Receive, from a transmitter integrated into a smart garment, a parameter indicating the smart garment presently is being worn by a user
605

Based on the at least one parameter indicating the smart garment presently is being worn by the user, identify the smart garment
610

Responsive to identifying the smart garment, determining a fashion recommendation for the user
615

Communicate the fashion recommendation to a client device associated with the user
620

FIG. 6

SMART GARMENT THAT COMMUNICATES AT LEAST ONE PARAMETER TO A RECEIVER

BACKGROUND

The present invention relates to smart fabrics and, more particularly, the use of smart fabrics in smart garments.

Smart fabrics are fabrics that include electronic components. Smart fabrics can perform tasks that traditional fabrics do not. For example, from an aesthetic perspective, smart fabrics can be illuminated and/or change color. Smart fabrics also have been developed for protective clothing to guard against extreme environmental hazards like radiation and the effects of space travel. The health and beauty industry also is taking advantage of innovations such as drug-releasing medical textiles, and fabrics that include moisturizer, perfume, and anti-aging properties.

SUMMARY

A method includes receiving, by a processor integrated into a smart garment, sensor data generated by a plurality of sensors integrated into the smart garment. The method also can include generating, by the processor, based on the sensor data, at least one parameter indicating a manner in which the smart garment is worn. The method also can include communicating to a receiver, by a transmitter integrated into the smart garment, the at least one parameter indicating the manner in which the smart garment is worn.

A smart garment includes a processor integrated into the smart garment and programmed to initiate executable operations comprising. The executable operations include receiving sensor data generated by a plurality of sensors integrated into the smart garment. The executable operations also can include generating, by the processor, based on the sensor data, at least one parameter indicating a manner in which the smart garment is worn. The executable operations also can include communicating to a receiver, by a transmitter integrated into the smart garment, the at least one parameter indicating the manner in which the smart garment is worn.

A computer program includes a computer readable storage medium having program code stored thereon. The program code is executable by a processor integrated into a smart garment to perform a method. The method includes receiving, by the processor, sensor data generated by a plurality of sensors integrated into the smart garment. The method also can include generating, by the processor, based on the sensor data, at least one parameter indicating a manner in which the smart garment is worn. The method also can include communicating to a receiver, by a transmitter integrated into the smart garment, the at least one parameter indicating the manner in which the smart garment is worn.

BRIEF DESCRIPTION OF THE DRAWINGS

FIG. 5 is a flow chart illustrating an example of a method of communicating to a receiver at least one parameter generated by a smart garment.

FIG. 6 is a flow chart illustrating an example of a method of communicating to a client device a fashion recommendation.

DETAILED DESCRIPTION

Figure 1:
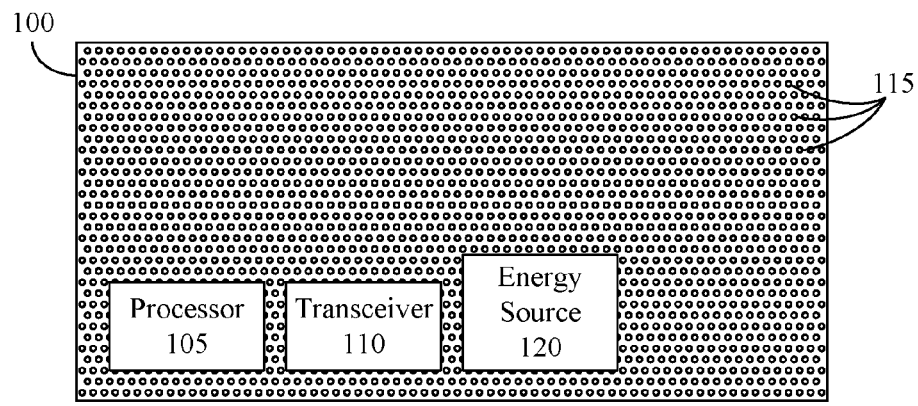
FIG. 1 is a pictorial diagram illustrating an example of a smart fabric.

The present invention relates to smart fabrics and, more particularly, the use of smart fabrics in smart garments. In accordance with the inventive arrangements disclosed herein, a smart garment can include a plurality of integrated sensors, an integrated processor and an integrated transmitter. The processor can receive sensor data generated by the plurality of sensors. Based on the sensor data, the processor can generate at least one parameter and communicate the parameter to a receiver. The receiver can communicate the parameter to a server. The server can process the parameter and, based on such processing, communicate any of a variety of information to a client device of a user wearing the smart garment. For example, the server can communicate to the client device information indicating fashion recommendations related to the smart garment. The server also can, based on such processing, communicate any of a variety of information to one or more retailer systems. For example, the server can communicate information with recommendations to improve sales of smart garments, indicate smart garments prone to defects, and so on.

Several definitions that apply throughout this document now will be presented.

As defined herein, the term "smart garment" means a garment made, at least in part, of smart fabric.

As defined herein, the term "smart fabric" means a fabric that includes at least at least one electronic component.

As defined herein, the term "client device" means a processing system including at least one processor and memory that requests shared services from a server, and with which a user directly interacts. Examples of a client device include, but are not limited to, a workstation, a desktop computer, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "server" means a processing system including at least one processor and memory that shares services one or more other systems and/or client devices.

As defined herein, the term "sensor" means a device that detects or measures a physical property and outputs corresponding data.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a pictorial diagram illustrating an example of a smart fabric 100. The smart fabric can include a processor 105. The smart fabric 100 also can include an RF transmitter (hereinafter "transmitter") 110 configured to transmit RF signals. In one arrangement, the transmitter 110 can be a component of a transceiver that also includes an RF receiver, although the present arrangements are not limited in this regard. The smart fabric 100 also can include a plurality of sensors 115 integrated into the smart fabric 100.

The processor 105 can include a computer readable storage medium, for example an erasable programmable read-only memory (EPROM or Flash memory), in which computer program code is stored. The computer program code can be executed by the processor, as will be described. The processor 105 also can include an accelerometer that detects movement, and/or any other suitable sensors or measurement components. Further, the processor 105 can include a plurality of input/output (I/O) ports to connect the processor to other devices, such as the transmitter 110 and the plurality of sensors 115. In one arrangement, the transmitter 110 can be a component of the processor 105.

Each of the plurality of sensors 115 can be communicatively linked to the processor 105, and the processor 105 can be communicatively linked to the transmitter 110. Electrical conductors (not shown) can be integrated into the smart fabric 100 to provide communication links between the processor 105 and the transmitter 110 and sensors 115. The smart fabric 100 also can include an energy source 120 that provides power to the processor 105, transmitter 110 and, optionally, the sensors 115. The energy source 120 can include, for example, a battery, a solar cell, a piezo electric charger, an inductive power supply, and/or any other devices that generate and/or provide electricity. In the case that the energy source 120 is an inductive power supply, the inductive power supply can generate electricity in response to a magnetic field generated by an inductive charger, as is known to those of ordinary skill in the art. Power can be conveyed from the energy source 120 to the processor 105, transmitter 110 and, optionally, the sensors 115 via electrical conductors.

In one arrangement, the electrical conductors can be embedded in threads of the smart fabric 100, for example by spinning the electrical conductors into the threads. In another arrangement, the electrical conductors can be woven with the threads into the smart fabric 100. Further, the sensors 115 can be embedded into the threads of the smart fabric 100 when the threads are spun or can be embedded into the smart fabric 100 when the smart fabric is woven from the threads. The processor 105 and transmitter 110 also can be embedded into the smart fabric 100 when the smart fabric 100 is woven from the threads, or can be attached to the smart fabric 100 after the smart fabric 100 is woven.

In another arrangement, the processor 105, transmitter 110 and sensors 115 can be embedded in a flexible material configured to be attached to fabric to form the smart fabric 100. For example, the flexible material can include a substrate into which the processor 105, transmitter 110, sensors 115 and conductors are embedded. The flexible material can include an adhesive on at least one side configured to attach the flexible material to the fabric. In illustration, the adhesive can be configured to be activated with heat and/or light to bond the flexible material to the fabric. In an arrangement in which the adhesive is heat activated, the processor 105, transmitter 110, sensors 115 and conductors can be configured to withstand the amount of activation heat without becoming damaged during the process of attaching the flexible material to the fabric.

The transmitter 110 can be configured to receive signals from the processor 105, encode the signals, modulate the signals, etc. to generate corresponding RF signals. For example, the transmitter 110 can generate RF signals in accordance with a suitable RF communication protocol, for example in accordance with one more IEEE 802-15 standards (e.g., Bluetooth®, Bluetooth® low energy (BLE), Zigbee®, and so on) and/or near field communication (NFC).

In one aspect, the sensors 115 can be capacitive sensors configured to output to the processor 105 respective signals corresponding to an amount of capacitance detected by the sensors 115. The sensors 115 also can be configured to detect a proximity of other sensors 115. For example, when the smart fabric 100 is folded, sensors may become in close proximity to one another (e.g., within 0.5 mm, 1 mm, 2 mm, 3 mm, 4 mm, 5 mm, etc.) of each other. A signal output by a particular sensor 115 can indicate whether another sensor 115 is proximate to the particular sensor and/or a distance between the sensors 115. Signals output by one or more sensors 115 also can indicate proximity of the sensors (115) to biological tissue. For example, when a garment made of the smart fabric 100 is worn, one or more sensors 115 may be placed proximate to a user's skin (e.g., within 0.5 mm, 1 mm, 2 mm, 3 mm, 4 mm, 5 mm, etc.), and the signals can indicate such.

In another arrangement, the sensors 115 can be contact sensors configured to output to the processor 105 respective signals corresponding to whether the sensors are in contact with other sensors. For example, a sensor 115 can output a first signal if the sensor 115 is physically contacting another sensor 115. The sensor 115 can output a second signal, or no signal, if the sensor 115 is not physically contacting another sensor 115. In illustration, for a particular sensor 115 to detect whether the sensor 115 is physically contacting another sensor 115, the sensor 115 can detect a level of electrical conductivity between the sensor 115 and the other sensor 115.

Still, other types of sensors 115 can be utilized, and the present arrangements are not limited in this regard. In one arrangement, more than one type of sensor can be used. For example, the plurality of sensors 115 can include capacitive sensors and/or contact sensors, and further include at least one temperature sensor, at least one humidity sensor and/or other types of sensors.

In one non-limiting arrangement, each sensor 115 also can include a radio frequency identifier (RFID) tag. Each RFID tag can include a computer readable storage medium, for example an erasable programmable read-only memory (EPROM or Flash memory), configured to store respective data for the sensor 115. The data can include a unique identifier for the respective sensor 115. In addition, each RFID tag also can include a receiver (or transceiver), a decoder, a power supply and a processor configured to detect an RF signal, decode the RF signal to identify data contained in the RF signal, and also store the data contained in the RF signal in the computer readable storage medium. The power supply can generate energy for the decoder and processor to operate from energy contained in the RF signal, as is known in the art. As will be described, the data contained in the RF signal can indicate in which component of a smart garment the sensor 115 is integrated.

Figure 2:
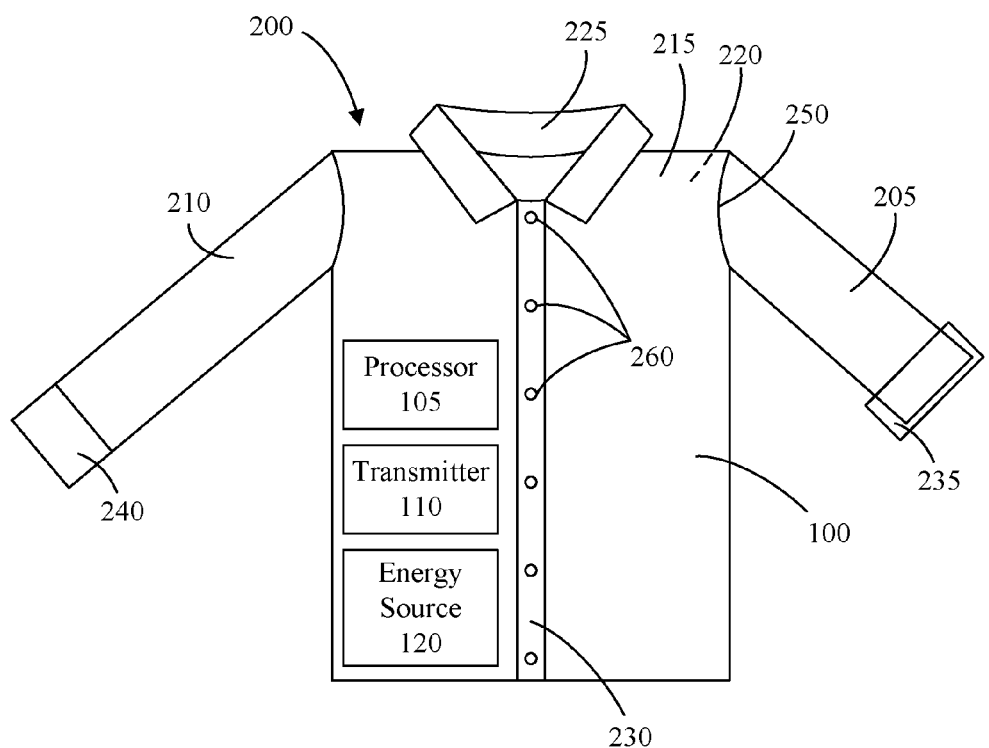
FIG. 2 is a pictorial diagram illustrating an example of a smart garment.

FIG. 2 is a pictorial diagram illustrating an example of a smart garment 200. The smart garment 200 can include the smart fabric 100 of FIG. 1. In illustration, the smart garment 200 can be made of the smart fabric 100. The smart garment 200 can be a shirt, a sweater, a jacket, pants, a skirt, a dress, or any other type of garment.

In one arrangement, different components 205, 210, 215, 220, 225, 230, 235, 240 of the smart garment 200 can be cut from the smart fabric 100, and perhaps one or more other smart fabrics (not shown) following a garment pattern, and the components 205-240 can be sewn together to create the smart garment 200. The processor 105, transmitter 110 and energy source 120 can be integrated into a respective portion of the smart fabric 100 used for any of the smart garment components 205-240, and the present arrangements are not limited in this regard.

During the cutting process, various electrical conductors may be cut. During the sewing process, electrical connections to the sensors 115 can be re-established by connecting ends respective ends of electrical conductors. For example, at a seam 250 where a sleeve 205 is connected to a front 215 and back 220 of the smart garment 200, there may be electrical conductors in the sleeve 205, front 215 and back 220 that have been cut, and the electrical conductors of the sleeve 205 can be attached to the electrical conductors of the front 215 and back 225 of the smart garment 200 to form continuous electrical connections between the processor 105 and the sensors 115. Since the sleeve 205, front 215 and back 220 may be cut from different portions of the smart fabric 100, the electrical path between the processor 105 and each sensor 115 in the sleeve 205 need not be the same electrical path that was between the processor 105 and each of such sensors 115 in the smart fabric 100 prior to the components 205-240 being cut from the smart fabric 100. The respective ends of the electrical conductors may be connected at the seam 250 by a person (e.g., a seamstress) while sewing the smart garment 200 or by a robot configured to perform such operation. The respective ends of the electrical conductors may be connected by soldering or welding the respective ends of the electrical conductors together, or using electrical connectors. The other components 205-240 of the smart garment 200 can be sewn, and respective ends of electrical conductors can be connected, in a similar manner.

At some point during manufacturing of the smart garment 200, for example after the components 205-240 have been cut from the smart fabric 100, each of the components 205-240 can be scanned using an RF scanner, such as an RFID scanner. The RFID scanner can be configured to scan each component 205-240 and communicate to the RFID tags of the respective sensors 115 data indicating in which component 205-240, and where in the component 205-240, the sensors 115 are integrated. For example, for a lower part of the sleeve 205, a person or automated system can enter data indicating "lower left sleeve" into the RFID scanner, and scan the portion of the smart fabric 100 in the lower part of the sleeve 205 with the RFID scanner. The RFID tag in each sensor 115 of the lower part of the sleeve 205 can detect the RF signal emitted by the RFID scanner, and store the data indicating "lower left sleeve" into the respective computer readable storage medium. Similarly, for a placket 230 of the smart garment 200, the person or automated system can enter data indicating a particular button or button hole in the placket 230 into the RFID scanner, and scan that portion of the placket 230 with the RFID scanner. The RFID tag in each sensor 115 near the particular button or button hole can detect the RF signal emitted by the RFID scanner, and store the data indicating "placket" and the particular "button or button hole" into the respective computer readable storage medium. The process can be repeated for each of the components 205-240, as well as different portions of the components 205-240.

At some point after the electrical conductors have been connected, and perhaps after the smart garment 200 is sewn, a person or automated system can provide to the processor 105 information identifying the smart garment 200, such as a garment model number, serial number, size, color style, etc. For example, the person or automated system can scan the processor with an RF device, such as an RFID scanner, which can communicate to the processor the data containing the identifying information. The processor 105 can store the data in the computer readable storage medium of the processor 105. In this regard, responsive to the processor 105 receiving, via a receiver (e.g., an RF receiver that is a component of a transceiver that includes the transmitter 110), an RF signal containing identifying information, the processor 105 can store data.

Further, the person or automated system can initiate the processor 105 to execute the program code of the processor 105 to retrieve baseline sensor data from the sensors 115 integrated into various the components 205-240 of the smart garment 200 to generate baseline measurements for the sensors 115. The processor can receive energy from the energy source 120, or energy contained in a received RF signal, to generate the baseline measurements, and can receive the baseline sensor data via the aforementioned electrical conductors. A person or automated system can initiate the processor 105 to retrieve the baseline sensor data by depressing a button integrated into the processor, or scanning the processor with an RF device. In the case an RF device is used, responsive to receiving an RF signal containing particular data, the processor 105 can execute computer program code that causes the processor to poll each of the sensors 115 integrated into the various the components 205-240 of the smart garment 200.

The processor 105 can store data received from each sensor 115 in one or more data tables within the computer readable storage medium of the processor 105. The data retrieved from each sensor 115 can identify the specific sensor 115, indicate in which component 205-240 respective sensor 115 is integrated, and indicate a portion of the component 205-240 in which the sensor 115 is integrated. The data also can include a baseline sensor reading, for example a capacitance reading, detected by the respective sensor. For each respective sensor 115, the processor 105 can create an association between the sensor identifier, the baseline sensor reading and the data indicating in which component 205-240, and in which portion of the components 205-240, the sensor is integrated. As each sensor 115 is polled by the processor 105, the respective sensor 115 can use energy contained in the polling signal to perform the baseline sensor reading and communicate the various data to the processor 105. Once the baseline sensor measurements are stored by the processor 105, the smart garment 200 is ready for packaging and sale. Of course, tags, etc. can be added to the smart garment 200 if this is desired.

The processor 105 can be configured to monitor sensor data generated by the sensors 115, and process the sensor data to determine if the smart garment 200 is being worn by a user. For example, responsive to the processor detecting movement (e.g., using an accelerometer) or detecting a particular RF signal, the processor 105 can initiate execution of program code to poll the sensors 115 to receive sensor data. When a sensors 115 is proximate to a user's biological tissue (e.g., skin), the sensors 115 can measure a value of capacitance that is different than a value of capacitance measured when the sensor 115 is not proximate to the user's biological tissue (e.g., different than the baseline sensor measurement). Thus, the processor 105 can be configured to determine that the sensor 115 is proximate to biological tissue if the sensor 115 generates a sensor value within a particular range of sensor values, which can be predetermined.

Responsive to the processor 105 receiving sensor data from a threshold number of the sensors 115 indicating that each of those sensors 115 is proximate to biological tissue, the processor 105 can determine that the smart garment 200 is being worn by a user. In response, the processor 105 can update data within the processor's computer readable storage medium indicating a number of times the smart garment 200 is worn. For example, the processor 105 can increment a value by one. In illustration, prior to the present detection of the smart garment 200 being worn, the smart garment 200 may have been worn ten times, and a corresponding value may have indicated such. Responsive to the present detection of the smart garment 200 being worn, the processor 105 can increment that value to eleven.

The processor 105 also can identify detect defects (e.g., rips, tears, etc.) in the smart garment 200. For example, responsive to polling the sensors 115, the processor 105 can determine whether sensor data is received from each of the sensors 115 identified in the data table in which the baseline sensor measurement data is stored. In illustration, the processor 105 can update the data table to indicate from which sensors 115 the processor 105 receives sensor data during the present polling process. The processor 105 also can store to the data table the sensor data that is received. If there are sensors 115 indicated in the data table based on the baseline measurement, but sensor data is not received from those sensors 115 during the present sensor poll, the processor can identify such sensors and the component 205-240, or portion of the component 205-240, of the smart garment 200 in which those sensors are integrated. If there are a threshold number of such sensors 115 in a particular component 205-240, then the processor 105 can determine that that component 205-240, or portion of the component 205-240, is defective. For example, a rip or tear in the smart fabric 100 may cause a break in one or more conductors connecting the processor 105 to the sensors 115, and the rip or tear can be considered a defect.

Further, the processor 105 can detect a manner in which the smart garment 200 is worn by the user. For example, responsive to detecting the smart garment 200 being worn, the processor 105 can periodically poll the sensors 115 and, based on the sensor data received, determine the manner in which the smart garment 200 is worn. For example, if the smart garment 200 is a shirt, and the sensor data generated by sensors 115 in lower portions of the front 215 and back 220 of the smart garment indicate that the sensors are within a threshold distance of biological tissue (e.g., within 1 mm or 2 mm) of biological tissue, the processor 105 can determine that the lower portion of the shirt is tucked in. If such sensors indicate that the sensors are not within the threshold distance of biological tissue, the processor 105 can determine that the shirt is not tucked in.

Based on the sensor data, the processor 105 also can determine whether a cuff 235 (or portion) of a sleeve 205 is rolled up, determine whether a collar 225 of the smart garment 200 is positioned to extend upward from the smart garment or folded down on the smart garment, and/or determine which buttons are fastened and which buttons are left unfastened. In illustration, when sensors 115 are positioned proximate to one another and not in the same plane, the sensor data generated by those sensors 115 may be different than the baseline sensor data, and within a particular range of sensor values. The processor can identify the sensors 115 generating sensor data within that range of sensor values and, based on the identified sensors 115 and the sensor values, determine the manner in which the garment is being ward. For instance, responsive to detecting sensors 115 in the cuff 235 of the lower portion of the left sleeve 205 generating sensor values in that range, the processor 105 can determine that the cuff 235 is rolled up. Responsive to determining that those sensors 115 are not generating sensor values in that range, the processor 105 can determine that the cuff 235 is not rolled up. Responsive to detecting sensors the collar 225 and sensors in the front 215 and back 220 of the smart garment 200 generating sensor values in that range, the processor 105 can determine that the collar 225 is down. Responsive to determining that those sensors 115 are not generating sensor values in that range, the processor 105 can determine that the collar is up. Responsive to detecting sensors in the placket 230 near a top button 260 or top button hole generating values in that range, the processor 105 can determine the top button 260 is fastened. Responsive to determining that those sensors 115 are not generating sensor values in that range, the processor 105 can determine that the top button 260 is not fastened. The processor 105 also can determine whether a zipper is fastened or left open in a similar manner. Still, the processor 105 can identify any other manner in which a smart garment may be worn, and the present arrangements are not limited in this regard.

Figure 3:
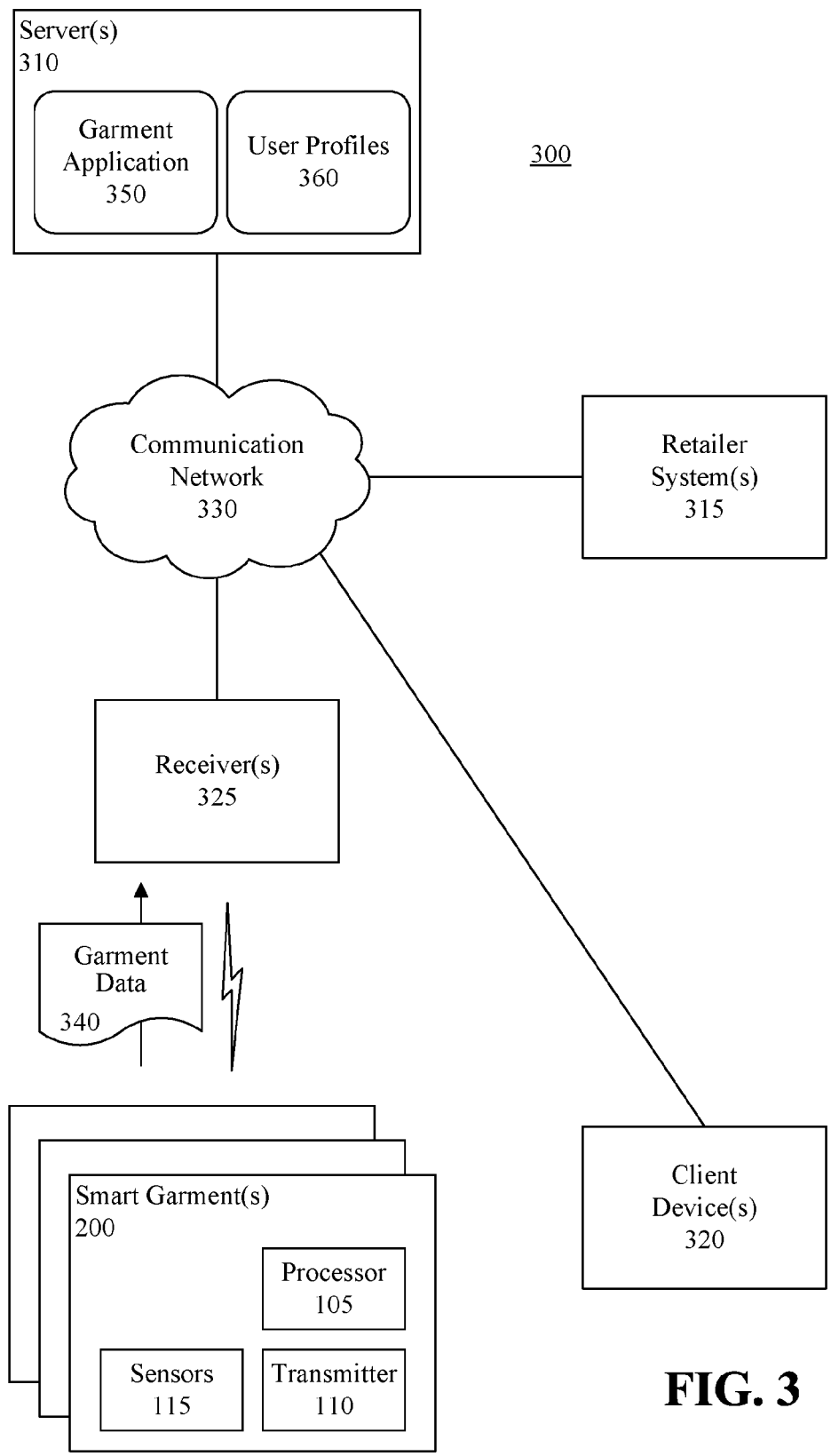
FIG. 3 is a block diagram illustrating an example of a data processing environment.

FIG. 3 is a block diagram illustrating an example of a data processing environment (hereinafter "environment") 300. The environment 300 can include the smart garment 200 of FIG. 2, and may include one or more additional smart garments. The environment 300 also can include one or more servers 310, one or more retailer systems 315, one or more client devices 320 and one or more receivers (e.g., transceivers) 325. The retailer systems 315 also can be servers, and may be communicatively linked to the server(s) 310 via a communication network 330. The client device(s) and receiver(s) 325 also can be communicatively liked to the server(s) 310 via the communication network 330.

The communication network 330 is the medium used to provide communications links between various devices and systems connected together within the environment 300. The communication network 330 may include connections, such as wire, wireless communication links, or fiber optic cables. The communication network 330 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

The server 310 can include a garment application 350 executable by one or more processors of the server 310. The garment application 350 can host a user interface in which the user interacts with the server 310 via the client device 320, or interface with a mobile application via which the user interacts with the server 310. The garment application 350 also can receive garment data 340, provide fashion recommendations to the user, and provide a myriad of other information to the user. Further, the garment application 350 can receive data from the retailer system(s) 315, and provide data and recommendations to the retailer system(s) 315.

Via the client device 320, a user who possesses a smart garment 200 can register the smart garment(s) 200 with the server 310, for example by interacting with a user interface provided by the garment application 350 or an application (e.g., a mobile application) that interfaces with the garment application 350. In illustration, the user can create and/or update a user profile 360. In the user profile 360, the user can input demographic information of the user, the age of the user, geographic location information of the user, a type of lifestyle of the user (e.g., physically active, socially active, etc.), health related information (e.g., physically fit, physically impaired, etc.), user household income, personality type, travel plans, and other user related information. Interfacing with the garment application 350, the user also can input identification information (e.g., a serial number) of a smart garment 200. Responsive to the garment application 350 receiving the information, the garment application 350 can associate the smart garment 200 with the user, for example by storing information in a data table associating the smart garment 200 with the user profile 360.

In another arrangement, the user can register the receiver(s) 325 with the user profile 360. For example, the user can enter identification information (e.g., a media access control (MAC) address or Internet protocol (IP) address of a receiver 325, as well as an indicator of where the receiver 325 is located (e.g., where in season garments are stored, where out of season or rarely used garments are stored, where informal garments are stored, where formal garments are stored, etc.). Thus, the garment application 350 can associate the receiver(s) 325 with the user, and associate any information received from the receiver(s) 325 with the user.

Each receiver 325 can be configured to send and receive RF signals communicated in accordance with one more suitable RF communication protocols. For example, the receiver(s) 325 can communicate in accordance with one or more of the IEEE 802-15 communication standards and/or near field communication (NFC). The receiver(s) 325 can receive garment data 340 from the transmitter 110 of the smart garment 200, as well as receive garment data from transmitters from other smart garments. By way of example, at least one receiver 325 can be located in a closet and/or bedroom of a user. In one aspect, multiple receivers 325 can be located in the user's place of residence. For instance, a receiver 325 can be located in the user's closet, a receiver 325 can be located in, on or near a dresser, hutch or cabinet where the user stores smart garments, a receiver 325 can be located in a storage room or an attic where smart garments may be stored, and do on. The client device(s) 320 and receiver(s) 325 also can be communicatively linked to the server(s) 310 via the communication network 330.

In operation, the processor 105 can collect sensor data from the sensors 115 as previously described and make corresponding determinations. Responsive to making the determinations, the processor 105 can generate garment data 340 and, via the transmitter 110, communicate the garment data 340 to a receiver 325. The garment data 340 can include, for example, data that identifies the smart garment 200, data indicating a number of times the smart garment 200 has been worn, data indicating any defects that may be contained in the smart garment 200 and where on the smart garment 200 those defects are located, data indicating the manner in which the smart garment 200 is being worn by the user, etc. In illustration, the receiver 325 may be a component of a transceiver configured to transmit a beacon signal. When the smart garment 200 is within range of the beacon signal, the processor 105 can detect, via a receiver of the smart garment 200 (e.g., an RF receiver of a transceiver that includes the transmitter 110), the beacon signal. In response to detecting the beacon signal, the processor 105 can collect the sensor data from the sensors 115, generate the garment data 340, and transmit, via the transmitter 110, the garment data 340 to the receiver 325.

The receiver 325 can receive the garment data 340 and communicate the garment data 340 to the garment application 350 via the communication network 330. In one arrangement, in addition to the garment data 340, the receiver 325 also can communicate to the garment application 350 information that identifies the receiver 325. Based on the garment data 340, the garment application 350 can determine whether the smart garment 200 is currently being worn by the user. If the smart garment 200 is not currently being worn by the user, the garment application 350 can assume that the smart garment 200 is being placed or removed from an area near the receiver 325. Also, based on the garment data 340, the garment application 350 can identify any defects that may be present in the smart garment 200, the number of times the user has worn the smart garment 200, the manner in which the user wears the smart garment 200, the temperature and/or humidity of the environment in which the user wears the smart garment 200, etc. Further, each time the garment application 350 receives garment data 340, the garment application 350 can store the data and associate the data with the user's user profile 360 and assign a time/date stamp to the garment data 340 indicating when the garment data 340 is received. Moreover, based on the time/date stamp and the user's geographic location, which may be indicated in the user's user profile 360, the garment application 350 can access climate data and identify weather conditions in the user's geographic location when the user wore the smart garment 200. The garment application 350 can, via the communication network 330, access the climate data from another application executing on the server(s) 310 or another system that stores such information.

In some cases, the garment application 350 may receive from the receiver 325 garment data 340 from a plurality of garments (e.g., a blouse and a pair of pants) in immediate succession, and each garment data 340 can indicate that the plurality of garments currently are being worn by the user. In such case, the garment application 350 can determine that the user has chosen to wear the plurality of garments together and generate corresponding information, which the garment application 350 can store to the user's user profile 360.

The garment application 350 can process the garment data 340, as well as garment data generated for smart garments of other users, to generate statistical information related to smart garments 200. The garment application 350 can process the statistical data to generate recommendations to users about smart garments the users may consider wearing. The garment application 350 can communicate such recommendations to the client device 320 of the user, for example via e-mail, text messaging, instant messaging or a mobile application. Accordingly, the garment application 350 can help the user select smart garments to create a fashionable outfit.

The recommendations provided by the garment application 350 can be based both on data discovery and data modeling. The data discovery can include obtaining data regarding clothing combinations, the manner in which smart garments 200 are worn, emerging fashion trends for specific age groups, emerging fashion trends for specific geographic regions, emerging fashion trends for demographic groups, influencers of fashion trends, fashion trend influencing factors, brand loyalty for different age, demographic and location groups, loyalty to particular retailers, discovery of different fashion market segments, the impact on fashion influencers on different market segments, and so on. The discovered data also can include retail transaction data, data pertaining to smart garments worn by users, feedback from users, reviews by users (e.g., internet based reviews), etc. The garment application 350 can implement data modeling on the data to identify correlations between garments used in different clothing combinations, identify garment usage in various geographic locations, identify garments used during specific types of activities and/or events, identify garments worn by certain age groups and demographic segments, identify user sentiment (e.g., by performing analysis of feedback obtained from users), and so on.

In illustration, based on the data modeling, the garment application 350 can identify trends in the manner in which smart garments 200 are worn. For instance, if the garment data 340 indicates that the user is wearing a smart garment 200, the server can communicate to the client device 320 information indicating the manner in which the smart garment 200 typically is worn, or has been worn by other people, and provide recommendations to the user as to the other types of smart garments other users may wear with the smart garment 200. In one arrangement, such information can be selected for the user based on the user's age, the user's demographic information, the user's geographic location, weather conditions at the user's geographic location, the day of the week, a scheduled user activity, a scheduled event, and so on.

Further, the user can add to the user's user profile 360 feedback on smart garments 200 worn by the user, an inventory of the user's other garments, travel plans, scheduled events, planned activities and so on. For travel plans, the user can input expected travel locations and planned activities and corresponding dates/times. For scheduled events, the user can input the locations of the scheduled events, and classify the scheduled events as casual, semi-formal or formal. For planned activities, the user can input the types of activities (e.g., hiking, boating, dining, etc.) and corresponding dates/times. At scheduled times, for example each day, the garment application 350 can communicate to the client device 320 a recommended outfit to wear based on garments included in the user's wardrobe and the travel plans, events and activities. Again, such recommendation can be based on the user's age, the user's demographic information, the user's geographic location or planned geographic location, weather conditions at the geographic location, the day of the week, the type of activity or event, and so on.

At some time prior to a scheduled event or activity, for example at a pre-determined time selected based on the user's user profile 360, the garment application 350 can recommend an outfit for the user using garments contained in the user's inventory. The garment application 350 can select the garments based on the classification of the activity or event and forecasted weather conditions at the time of the activity or event where the activity or event is scheduled. The server can communicate the garment recommendations to the client device 320. In addition, at some time prior to a user traveling, based on the user's travel plans, the garment application 350 can select garments appropriate for the user based on the user's travel plans, and communicate corresponding recommendations to the user. Accordingly, the user can select a fashionable wardrobe for the trip. The garment application 350 also can communicate to the client device 320 event reminders to remind the user of the upcoming activity, event or travel plans.

In an aspect of the present arrangements in which multiple receivers 325 are present in the residence of the user, for example if the user stores smart garments 200 in multiple different locations, the garment application 350 can store in the users user profile 360 data indicating the location of each smart garment 200. The location of each smart garment 200 can be determined to be in a location serviced by the receiver 325 which last received garment data 340 from the smart garment 200. When generating a recommendation for communication to the user's client device 320 indicating a suggestion of a smart garment 200 to wear, the garment application 350 also can indicate wear the smart garment 200 is located. This can save the user much time in finding such smart garments. Further, as seasons change, different smart garments 200 may come into fashion, while other smart garments 200 may go out of fashion. The garment application 350 can periodically analyze the user's wardrobe, and make recommendations to the user which smart garments 200 should be moved to storage and which smart garments 200 should be moved to the user's closet, dresser or hutch. Such recommendations also can be communicated to the user's client device 320.

Using the garment application 350, or another application hosted by the server 310, users can share their wardrobes with other selected users. As noted, the garment application 350 can receive from a user a listing of garments contained in the user's wardrobe. The user can select garments, or groups of garments, which the user chooses to share with the user's friends. Other users also can share their garments with the user. When providing garment recommendations for a particular user, the garment application 350 can consider not only garments contained in the user's wardrobe, but also contained in the wardrobes of other users who have selected to share their garments with the user. When the garment application 350 recommends to the user a garment contained in another user's wardrobe, the garment application 350 can identify the other user. Thus, the user to whom the recommendation is provided can contact the other user to ask to borrow the garment. In one arrangement, the garment application 350 can automate such request. For example, the garment application 350 can present a user interface element (e.g., check box, menu item, etc.) which the user may select. In response to the user selecting the user interface element, the garment application 350 can automatically generate a message indicating that the user desires to borrow the garment, and communicate the message to the client device of the other user.

Further, the garment application 350 can communicate to the client device 320 style guides with recommendations on fashionable ways to wear the garments. Such style guides can be provided by retailers, other users and/or clothing designers. For example, various style guides can be directed to different age groups, geographic locations, demographic segments, lifestyles, activities, etc. The garment application 350 can process the user's user profile 360 and other information received for the user to select one or more style guides applicable to the user, and communicate the selected style guides to the user. Moreover, the user can provide feedback and sentiment on the selected style guides. The garment application 350 can receive such feedback and sentiment, as well as feedback and sentiment from other users, and process the feedback/sentiment to update the style guides, rank the style guides, etc. When selecting one or more style guides, the garment application 350 can perform such selection based, at least in part, on previous feedback received on the style guides, both from the user and from other users.

In another aspect, responsive to identifying in the garment data 340 that a smart garment 200 is damaged, or may be due for replacement based on a number of times the smart garment 200 has been work (and likely washed), the garment application 350 can communicate to the client device 320 a replacement alert notifying the user that the user may consider replacing the smart garment 200. The garment application 350 also can communicate with retailer systems 315 to identify similar smart garments, and communicate to the client device 320 offers on similar garments. Such offers can indicate prices, discounts, sales events, etc.

The garment application 350 also can communicate to the retailer systems 315 information to help retailers in selecting and presenting smart garments 200 for sale, and better serve the needs and concerns of their customers. For example, the garment application 350 can communicate to the retailer systems 315 feedback reports in which user feedback for smart garments 200 is summarized and/or analyzed. Further, the garment application 350 can communicate to the retail systems 315 recommendations for product placement, recommendations on how smart garments 200 should be displayed in retail locations, indicate smart garments 200 having high rates of defects (which can indicate low quality fabric being used or low quality manufacturing), indicate smart garments 200 having low rates of defects, indicate smart garments 200 that are worn most frequently, indicate demographic and/or age information for users that typically wear certain types of smart garments 200, and so on. The garment application 350 also can communicate to the retail systems 315 product scoring indicating how well different smart garments 200 sell. The garment application 350 also can communicate data related to other customer interactions, for example how often smart garments 200 are returned, etc.

Further, the garment application 350 can receive from one or more retailer systems 315 various types of information, for example data on clothing inventory at one or more stores, data indicating geographic locations of stores, store plan information, lines of clothing currently offered, lines of clothing being considered for offer, sales reports, retailer feedback, etc. The garment application 350 can process such data, along with garment data 340 received from various smart garments, user profile 360 information, user feedback, the previously described discovered data and the previously described data modeling, to generate data useful for retailers in selecting and presenting smart garments for sale to target different user segments. For example, the garment application 350 can generate garment inventory recommendations based on emerging fashion trends (both general and among specific demographics), fashion influences, recommended clothing combinations, newly available garments, merchandising recommendations, smart garment purchase and use patterns for demographic segments, etc.

Figure 4:
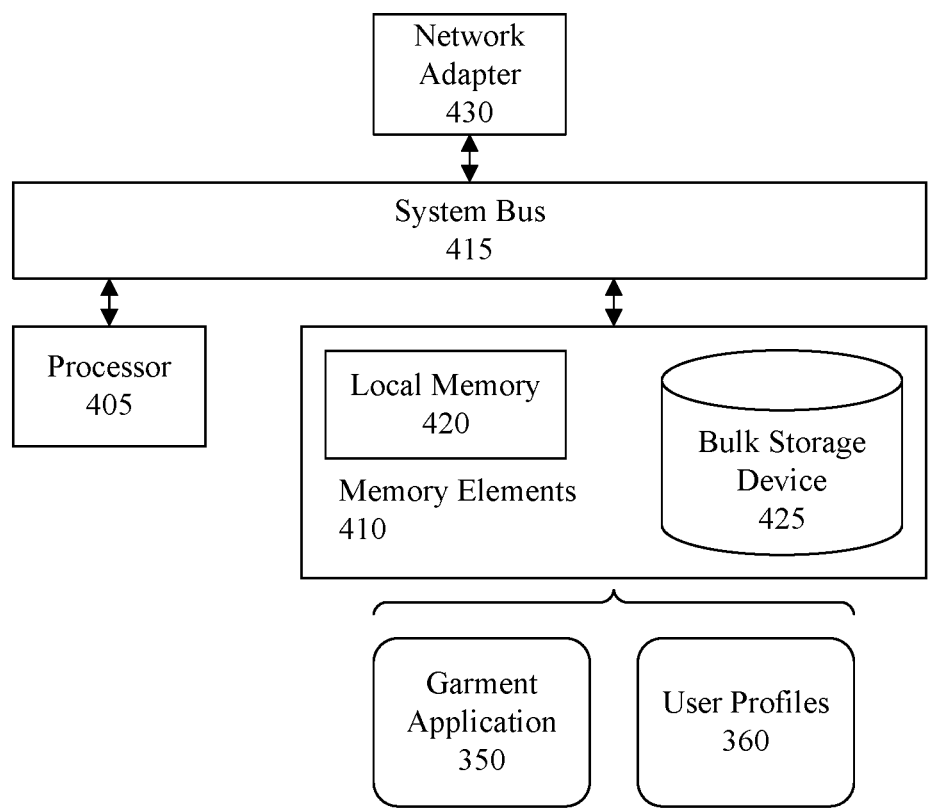
FIG. 4 is a block diagram illustrating example architecture for a server.

FIG. 4 is a block diagram illustrating example architecture for the server 310. The server 310 can include at least one processor 405 (e.g., a central processing unit) coupled to memory elements 410 through a system bus 415 or other suitable circuitry. As such, the server 310 can store program code within the memory elements 410. The processor 405 can execute the program code accessed from the memory elements 410 via the system bus 415. It should be appreciated that the server 310 can be implemented in the form of any system including a processor and memory that is capable of performing the functions and/or operations described within this specification.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The server 310 also can include one or more cache memories (not shown) that provide temporary storage of at least some program code in order to reduce the number of times program code must be retrieved from the bulk storage device 425 during execution.

At least one network adapter 430 can be coupled to the server 310 either directly or through intervening I/O controllers. The network adapter 430 can enable the server 310 to become coupled to other systems, computer systems, remote printers, and/or remote storage devices through intervening private or public networks. Modems, cable modems, transceivers, and Ethernet cards are examples of different types of network adapters 430 that can be used with the server 310.

As pictured in FIG. 4, the memory elements 410 can store the components of the server 310, namely the garment application 350 and the user profile 360. Being implemented in the form of executable program code, the garment application 350 can be executed by the server 310 and, as such, can be considered part of the server 310. Moreover, the garment application 350 and the user profiles 360 are functional data structures that impart functionality when employed as part of the server 310.

FIG. 5 is a flow chart illustrating an example of a method 500 of communicating to a receiver at least one parameter generated by a smart garment. At step 505, a processor integrated into the smart garment can receive sensor data generated by a plurality of sensors integrated into the smart garment. At step 510, the processor can, based on the sensor data, generate at least one parameter indicating a manner in which the smart garment is worn. For example, the parameter can indicate wither at least one sleeve of the smart garment is rolled up, indicate whether a collar of the smart garment is positioned to extend upward from the smart garment or folded down on the smart garment, and/or indicate at least one button of the smart garment that is not fastened. the at least one parameter further can indicate damage to the smart garment, a length of time the smart garment is worn and/or a number of times the smart garment is worn. At step 515, a transmitter integrated into the smart garment can communicate to a receiver the at least one parameter, the at least one parameter at least indicating the manner in which the smart garment is worn.

FIG. 6 is a flow chart illustrating an example of a method 600 of communicating to a client device a fashion recommendation. At step 605, a server can receive, via a receiver, from a transmitter integrated into a smart garment, a parameter indicating the smart garment presently is being worn by a user. At step 610, based on the at least one parameter indicating the smart garment presently is being worn by the user, the server can identify the smart garment. At step 615, responsive to identifying the smart garment, the server can determine a fashion recommendation for the user. For example, the server can determine a manner in which the smart garment may be worn, other garments that may be worn with the smart garment, and so on. At step 620, the server can communicate the fashion recommendation to a client device associated with the user, for example a client device used by the user.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a processor integrated into a smart garment, sensor data generated by a plurality of sensors integrated into the smart garment;
generating, by the processor, based on the sensor data, at least one parameter indicating a manner in which the smart garment is worn; and
communicating to a receiver, by a transmitter integrated into the smart garment, the at least one parameter indicating the manner in which the smart garment is worn.

2. The method of claim 1, wherein the at least one parameter indicating the manner in which the smart garment is worn indicates whether at least one sleeve of the smart garment is rolled up.

3. The method of claim 1, wherein the at least one parameter indicating the manner in which the smart garment is worn indicates whether a collar of the smart garment is positioned to extend upward from the smart garment or folded down on the smart garment.

4. The method of claim 1, wherein the at least one parameter indicating the manner in which the smart garment is worn indicates at least one button of the smart garment that is not fastened.

5. The method of claim 1, wherein the at least one parameter further indicates damage to the smart garment.

6. The method of claim 1, wherein the at least one parameter further indicates a length of time the smart garment is worn.

7. The method of claim 1, wherein the at least one parameter further indicates a number of times the smart garment is worn.

8. A smart garment, comprising:
a processor integrated into the smart garment and programmed to initiate executable operations comprising:
receiving sensor data generated by a plurality of sensors integrated into the smart garment;
generating, based on the sensor data, at least one parameter indicating a manner in which the smart garment is worn; and
communicating to a receiver, by a transmitter integrated into the smart garment, the at least one parameter indicating the manner in which the smart garment is worn.

9. The smart garment of claim 8, wherein the at least one parameter indicating the manner in which the smart garment is worn indicates whether at least one sleeve of the smart garment is rolled up.

10. The smart garment of claim 8, wherein the at least one parameter indicating the manner in which the smart garment is worn indicates whether a collar of the smart garment is positioned to extend upward from the smart garment or folded down on the smart garment.

11. The smart garment of claim 8, wherein the at least one parameter indicating the manner in which the smart garment is worn indicates at least one button of the smart garment that is not fastened.

12. The smart garment of claim 8, wherein the at least one parameter further indicates damage to the smart garment.

13. The smart garment of claim 8, wherein the at least one parameter further indicates a length of time the smart garment is worn.

14. The smart garment of claim 8, wherein the at least one parameter further indicates a number of times the smart garment is worn.

15. A non-transitory computer program product comprising a computer readable storage medium having program code stored thereon, the program code executable by a processor integrated into a smart garment to perform a method comprising:
 receiving, by the processor, sensor data generated by a plurality of sensors integrated into the smart garment;
 generating, by the processor, based on the sensor data, at least one parameter indicating a manner in which the smart garment is worn; and
 communicating to a receiver, by a transmitter integrated into the smart garment, the at least one parameter indicating the manner in which the smart garment is worn.

16. The non-transitory computer program product of claim 15, wherein the at least one parameter indicating the manner in which the smart garment is worn indicates whether at least one sleeve of the smart garment is rolled up.

17. The non-transitory computer program product of claim 15, wherein the at least one parameter indicating the manner in which the smart garment is worn indicates whether a collar of the smart garment is positioned to extend upward from the smart garment or folded down on the smart garment.

18. The non-transitory computer program product of claim 15, wherein the at least one parameter indicating the manner in which the smart garment is worn indicates at least one button of the smart garment that is not fastened.

19. The non-transitory computer program product of claim 15, wherein the at least one parameter further indicates damage to the smart garment.

20. The non-transitory computer program product of claim 15, wherein the at least one parameter further indicates a length of time the smart garment is worn or a number of times the smart garment is worn.

* * * * *